UNITED STATES PATENT OFFICE.

PETER HOGAN, OF MILTON, NEW YORK.

FERTILIZER.

SPECIFICATION forming part of Letters Patent No. 397,056, dated January 29, 1889.

Application filed March 26, 1888. Serial No. 268,592. (No specimens.)

*To all whom it may concern:*

Be it known that I, PETER HOGAN, a citizen of the United States, and a resident of the town of Milton, Saratoga county, New York, have invented a cetain new and useful Process for Producing Products and Fertilizers, of which the following is a specification.

I have discovered that in the process of converting vegetable substances into chemical fiber the solution employed when made from alkalies—such as soda, caustic soda, potash, &c., together with the lignine associated with the liquor after cooking or digesting the vegetable substances—can be utilized for producing fertilizers, and that a large proportion of the original weight of the vegetable substances—such as wood, straw, grasses, and other vegetable materials or ingredients—are composed of silica, soda, potash, magnesia, lime, and other salts extracted from the soil in the progress of the growth and development of the plant composing the lignine. I propose to use all of these ingredients resulting from the cooking or digesting of vegetable substances, together with the soda, potash, or alkaline salts in the manufacture of chemical fiber, glucose, sorghum, or other works, either separately or in combination with peat, clay, carbonate of lime, or similar substances having a solid or granular absorbing nature, which will be convenient for handling.

In the practice of my process for treating the liquor containing the dissolved lignine from vegetable substances and the alkaline salts also contained in the liquor and united with the dissolved lignine, I prefer to take the liquor after being drawn from the mass of digested wood, straw, or other vegetable substances, with the strength it may have, and with this liquor saturate one or more times suitable bodies or masses of peat, clay, lime, or other absorbents of the liquor, either before or after pulverizing the same, and when a sufficient quantity of the lignine, with its associate alkaline salts, has been incorporated with the peat or other absorbing material, I treat this compound thus produced in a suitable manner for expelling or eliminating the water and leaving the resulting product comparatively dry, after which I reduce this dried product to a powdered form, adding to the same any special fertilizing ingredients which may be required.

By my described process I am enabled to produce fertilizers of different degrees of strength as to alkaline salts or vegetable or mineral matter. This is a great advantage, as by this variety of alkaline salts and humus matter fertilizers for every kind of soil, whether of sand, clay, or lime formations or sand and clay loam, or mixtures of the same, can be supplied with fertilizers having in all cases plant food derived wholly from dissolved organic substances originally in the plants, while in other cases the alkaline salts and humus may be graded according to the particular requirements or nature of the soil.

By my described process I am enabled to utilize the great amount of dissolved lignine which is now destroyed, resulting from the conversion of vegetable substances into fiber for paper-making and similar works.

It is to be understood that I do not confine myself to any particular method or means to be employed for expelling the water from the compound or the method or means of compounding the same with other ingredients or of saturating the absorbing material before expelling the water.

What I claim, and desire to secure by Letters Patent, is—

A new product consisting of a fertilizer composed of dissolved lignine from vegetable substances, and alkaline salts from the digesters in the manufacture of chemical fiber or other similar works, in combination with peat, clay, lime, earth, or other absorbing matter introduced for the purposes described.

PETER HOGAN.

Witnesses:
FREDERICK W. CAMERON,
WALTER E. WARD.